United States Patent [19]

Becher

[11] Patent Number: 5,012,904
[45] Date of Patent: * May 7, 1991

[54] CENTRIFUGAL BRAKE AND GYROSCOPES INCLUDING SAME

[75] Inventor: Yona Becher, Rishon LeZion, Israel

[73] Assignee: Israel Aircraft Industries Ltd., Lod, Israel

[ * ] Notice: The portion of the term of this patent subsequent to Jan. 7, 2004 has been disclaimed.

[21] Appl. No.: 566,567

[22] Filed: Dec. 29, 1983

[30] Foreign Application Priority Data

Dec. 31, 1982 [IL] Israel .......................................... 67600

[51] Int. Cl.⁵ .............................................. G01C 19/30
[52] U.S. Cl. ....................................... 188/185; 74/5.5; 192/103 B
[58] Field of Search .................... 188/184, 185, 186; 74/5.1, 5.5, 5.45; 192/103 B, 105 CD

[56] References Cited

U.S. PATENT DOCUMENTS

| | | | |
|---|---|---|---|
| 1,230,560 | 6/1917 | Camp | 188/184 |
| 1,424,523 | 8/1922 | Saives | 188/184 |
| 3,175,666 | 3/1965 | Katzenstein | 192/103 B |
| 4,355,540 | 10/1982 | Chombard et al. | 188/185 |

FOREIGN PATENT DOCUMENTS 1498017 12/1968 Fed. Rep. of Germany ...... 188/184

Primary Examiner—Duane A. Reger
Assistant Examiner—Alvin Oberley
Attorney, Agent, or Firm—Kuhn and Muller

[57] ABSTRACT

A centrifugal brake for limiting the rotational speed of a rotatable body with respect to a reference body, which brake includes a brake element movable by centrifugal force into engagement with an abutment member fixed to the reference body when the rotational speed of the rotatable body exceeds a predetermined value with respect to the reference body; characterized in that the brake element is disposed at a corner of a parallelogram mechanism made of a plurality of pivotably-coupled links such that the brake element is displaced into contact with the abutment member of the reference body when the rotational speed of the rotatble body exceeds the predetermined value.

10 Claims, 3 Drawing Sheets

CENTRIFUGAL BRAKE AND GYROSCOPES INCLUDING SAME

FIELD OF THE INVENTION

The present invention relates to centrifugal brakes for limiting the rotational speed of a rotating body with respect to a reference body. The invention is particularly useful for gyroscopes to limit the rotational speed of the outer gimbal assembly with respect to the gyroscope frame, and is therefore described below in connection with such an application.

BACKGROUND OF THE INVENTION

As known, when the power supply to a high-speed gyroscope rotor is interrupted, either intentionally or accidentally, the rotor will slow down because of resistive and frictional forces. If the rotor is not perpendicular to the shaft of the outer gimbal assembly, the inner gimbal assembly may pivot with respect to the outer gimbal assembly, to engage a stop thereon, and to cause the whole outer gimbal assembly to rotate with respect to the frame. This may cause damage to the gyroscope, and therefore a number of centrifugal brake arrangements have been devised for limiting the rotational speed of the outer gimbal assembly with respect to the frame. U.S. Pat. No. 3,363,473 illustrates one example of a known centrifugal brake for this purpose, and our patent specification No. 61077 illustrates another example. As a rule, however, the known centrifugal brakes are capable of limiting the rotational speed of the outer gimbal assembly only to about 350 RPM.

An object of the present invention is to provide a new centrifugal brake for limiting the rotational speed of a rotatable body with respect to a reference body. A more particular object of the invention is to provide a novel gyroscope having an improved centrifugal brake which is capable of limiting the rotational speed of the outer gimbal assembly with respect to the gyroscope frame to a lower speed than the previously-mentioned centrifugal brakes.

SUMMARY OF THE INVENTION

According to a broad aspect of the present invention, there is provided a centrifugal brake for limiting the rotational speed of a rotatable body with respect to a reference body, which brake includes a brake element movable by centrifugal force into engagement with an abutment member fixed to the reference body when the rotational speed of the rotatable body exceeds a predetermined value with respect to the reference body; characterized in that the brake element is disposed at a corner of a parallelogram mechanism made of a plurality of pivotably-coupled links such that the brake element is displaced into contact with the abutment member of the reference body when the rotational speed of the rotatable body exceeds the predetermined value.

Preferably, there are two of the brake elements, each disposed at one of the two opposite corners of the parallelogram mechanism.

According to a further important feature of the present invention, each of the brake elements is preferably a rotatable member which engages the respective abutment member of the reference body to also apply a torque to the rotatable body via the mechanism. In the preferred embodiment described below, each of the rotatable members is a gear, and the respective abutment member is formed with recesses receiving the teeth of the gear when it is brought into contact with the abutment member.

The invention is particularly applicable as a centrifugal brake for limiting the rotational speed of the outer gimbal assembly with respect to the frame. Thus, when rotatable members are used as the brake elements, they are effective when engaging their respective abutments, not only to limit the rotational speed of the outer gimbal assembly with respect to the frame, but also to apply a torque which produces precession on the inner gimbal assembly to withdraw it from the stop which it engages and which causes the rotation of the outer gimbal assembly. Further, by making these brake elements in the form of gears receivable within recesses of the abutment members, the contact time between the two is increased, thereby enhancing the speed-limiting and precession effects described above. It has been found that such a centrifugal brake construction is easily capable of limiting the rotational speed of the outer gimbal assembly to a significantly lower speed than the previously-described centrifugal brake constructions.

Further features and advantages of the invention will be apparent from the description below.

BRIEF DESCRIPTION OF THE DRAWINGS

The invention as herein described, by way of example only, with reference to the accompanying drawings, wherein.

DETAILED DESCRIPTION OF A PREFERRED EMBODIMENT

Figure 1:
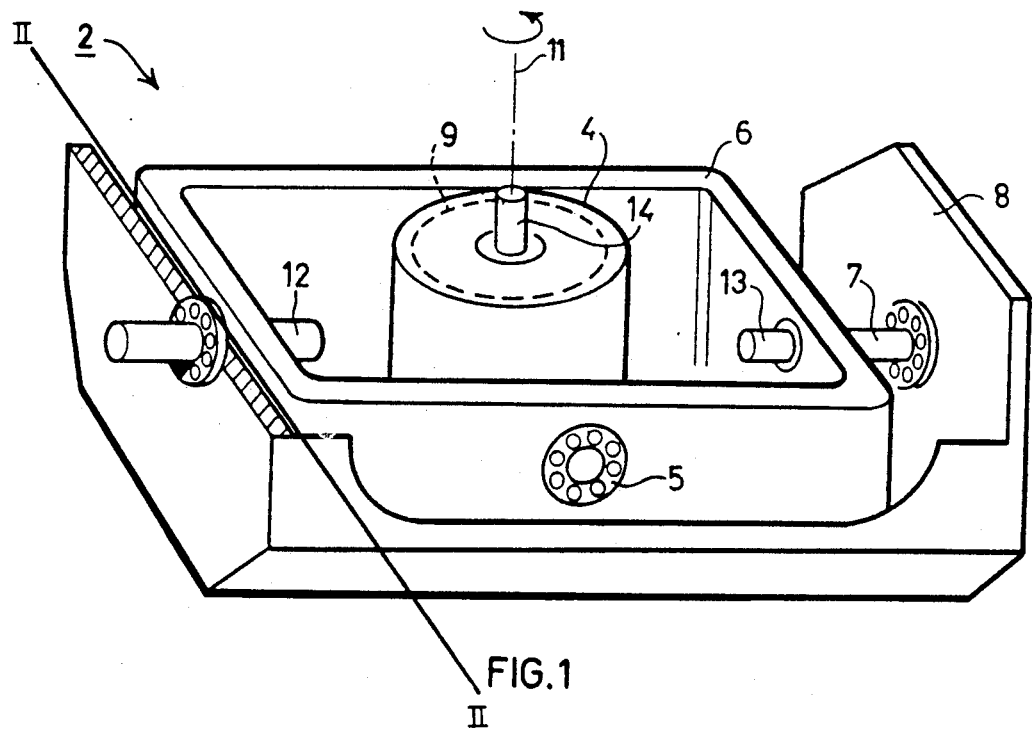
FIG. 1 is a three-dimensional view of a gyroscope assembly including a centrifugal brake constructed in accordance with the present invention for limiting the rotational speed of the outer gimbal assembly with respect to the frame.
Figure 3:
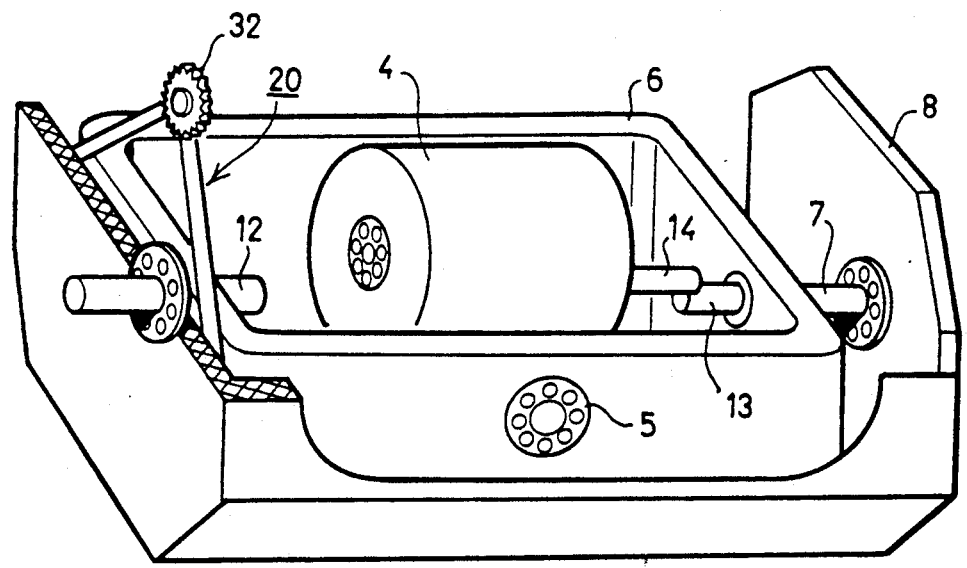
FIG. 3 illustrates the gyroscope assembly of FIG. 1 with the centrifugal brake mechanism in its actuated condition to limit the rotational speed of the outer gimbal assembly.

With reference to FIG. 1, there is illustrated a gyroscope assembly, generally designated 2, including an inner gimbal assembly 4 pivotably mounted about a first axis by means of bearing shaft 5 to an outer gimbal assembly 6, the latter being pivotably mounted by means of bearing shaft 7 to the outer frame 8 along a second axis which is at a right angle to the axis of bearing shaft 5. The gyroscope rotor 9 is driven at a high rotational speed by a motor, e.g., in the order of 24,000

RPM, about the spin axis 11, which is at a right angle to the two axes of shafts 5 and 7, respectively.

It will be seen that the spin axis 11 is fixed in space, so that, with changes in the position of the reference body (i.e., frame 8), the inner gimbal assembly 4 pivots about the axis of shaft 5. The other gimbal assembly 6 is provided with stops 12, 13 located to permit the inner gimbal assembly to pivot a maximum of about 82° in either direction, at which point an extension 14 on the inner gimbal assembly 4 engages one of the two stops 12, 13. The engagement of extension 14 with one of the stops causes the outer gimbal assembly 6 to pivot (precess) about the axis of the outer gimbal shaft 7.

As briefly described above, while the power is on and drives the rotor 9 about the spin axis 11, the outer gimbal assembly 4 will pivot about the inner gimbal shaft 5 for a maximum of about 82° until it engages one of the stops 12, 13 at which time the outer gimbal assembly precesses at a high rate until the stop is disengaged. However, when the power to the rotor is interrupted, the engagement of one of the stops 12, 13 by the inner gimbal assembly 4 causes the outer gimbal assembly 6 to rotate continuously with respect to frame 8 and at an accelerated speed, such that damage may be caused to the gyroscope if this speed is not limited.

Figure 2:
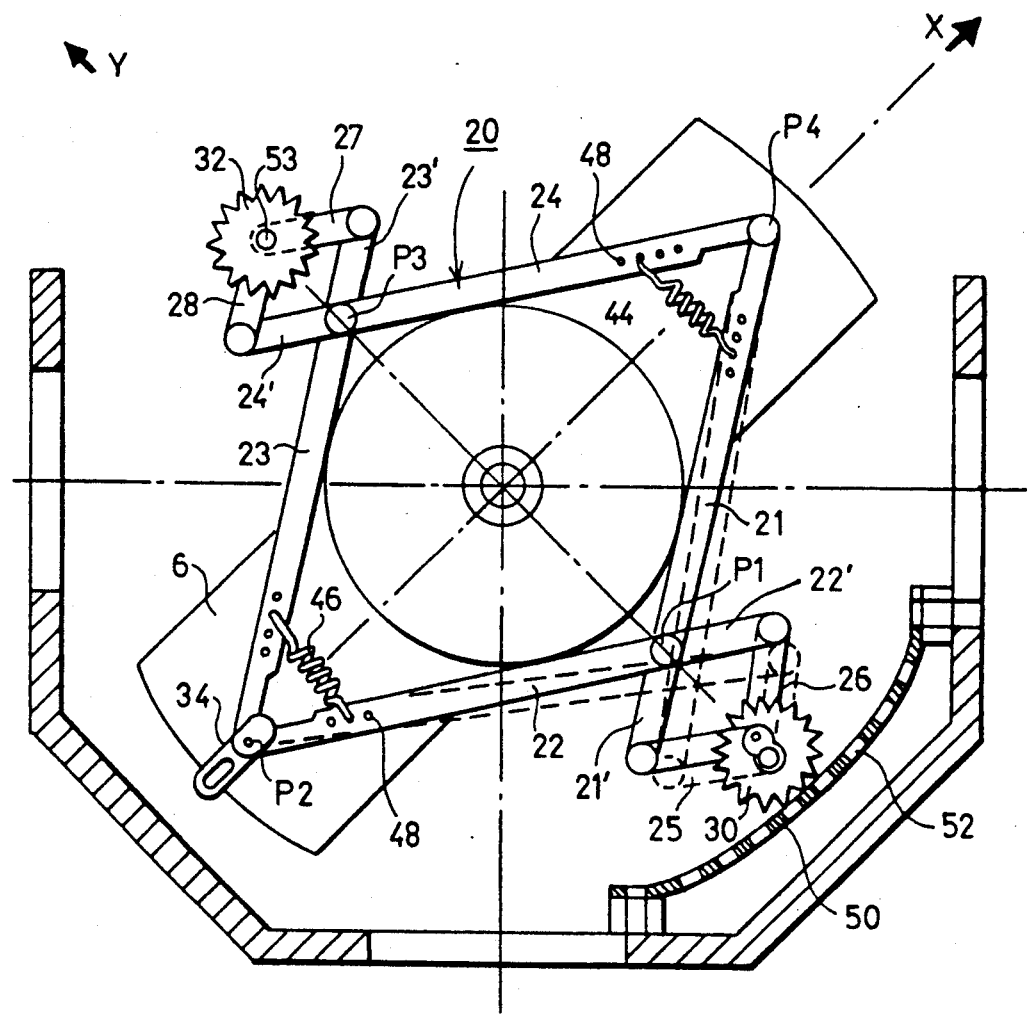
FIG. 2 is a sectional view along lines II—II of FIG. 1 to illustrate the centrifugal brake mechanism included in the gyroscope.

FIG. 2 illustrates the centrifugal brake mechanism included in the gyroscope of FIG. 1 for limiting the rotational speed of the outer gimbal assembly 6 with respect to the frame 8.

The illustrated centrifigul brake mechanism comprises a parallelogram, or pantograph, parallel-motion mechanism, generally designated 20, including four long links 21, 22, 23 and 24 pivotably connected to each other by pivot pins $P_1$, $P_2$, $P_3$, $P_4$ to from a parallelogram. At one corner of the parallelogram mechanism 20, links 21 and 22 are extended past pivot pin $P_1$, and their extensions 21', 22' are pivotably coupled to short links 25 and 26, respectively, to form a smaller parallelogram mechanism at that corner. A similar arrangement is provided at the opposite corner of mechanism 20, wherein links 23 and 24 are both extended past pin $P_3$, and their extensions 23', 24' are pivotably coupled to further short links 27, 28 to form a second smaller parallelogram mechanism.

A rotatable gear 30 is supported at the outer tip of the smaller parallelogram mechanism formed by short links 25, 26 with link extensions 21', 22'; and another rotatable gear 32 is supported at the outer tip of the other smaller parallelogram mechanism formed by short links 27, 28 with link extensions 23', 24'. Gears 30 and 32 are weighted, and act as brake elements actuable by centrifugal force to engage abutment members carried by the frame 8, to limit the rotational speed of the outer gimbal assembly 6 with respect to the frame, as will be described more particularly below.

Figure 4:
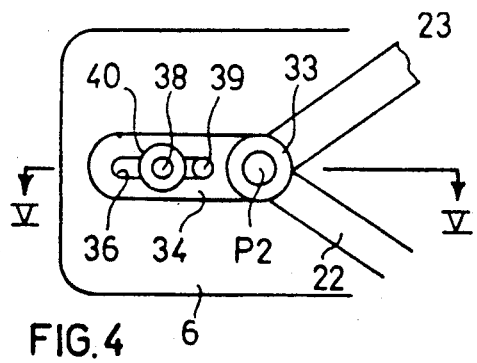
FIG. 4 is an enlarged fragmentary view illustrating the displaceable mounting at one corner of the centrifugal mechanism of FIG. 2.
Figure 5:
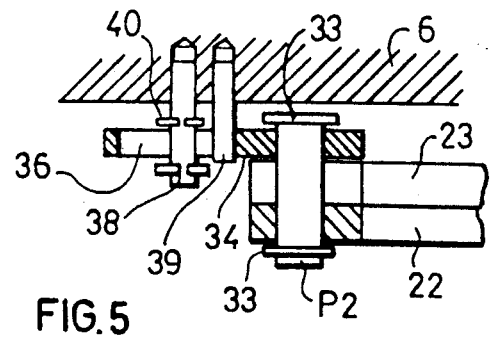
FIG. 5 is a sectional view along lines V—V of FIG. 4.

Pivot pin $P_2$ at one corner of the parallelogram mechanism 20 is mounted to the outer gimbal assembly 6 by a pin-and-slot connection which permits inward and outward movement of the respective corner of the mechanism with respect to the center of rotation (i.e., shaft 7) of the outer gimbal assembly. Such a connection is more particularly illustrated in FIGS. 4 and 5, wherein it will be seen that pivot pin $P_2$ is secured by clips 33 to a slide plate 34 formed with an elongated slot 36. Two pins 38, 39 fixed to the outer gimbal assembly 6 are disposed in spaced relationship within slot 36, pin 38 receiving a pair of retainer clips 40 for retaining plate 34 and pivot pin $P_2$ attached to it. Links 22, 23 are pivotably mounted on pin $P_2$ and are retained thereon by the clips 33.

It will thus be seen that pivot pin $P_2$ at one corner of the parallelogram mechanism 20 is displaceable, with respect to the outer gimbal assembly 6, towards and away from axis 7 of the outer gimbal assembly.

Figure 6:
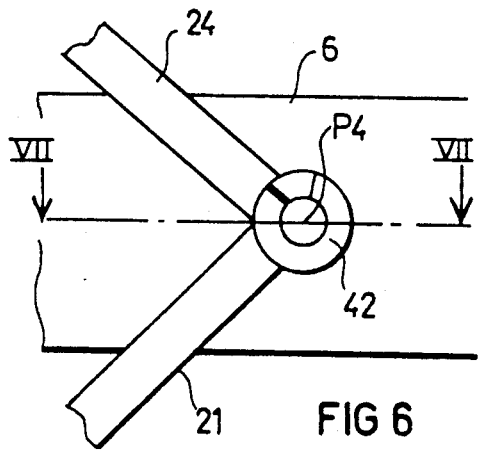
FIG. 6 is an enlarged fragmentary view illustrating the non-displaceable mounting at another corner of the centrifugal mechanism of FIG. 2.
Figure 7:
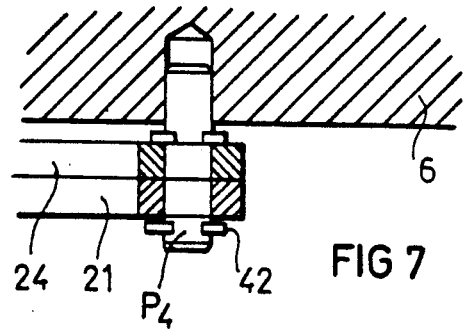
FIG. 7 is a sectional view along lines VII—VII of FIG. 6.

Pivot pin $P_4$ at the opposite corner of the parallelogram mechanism 20 is not displaceable towards or away from the axis of rotation 7 of the outer gimbal assembly 6, as in the case of pivot pin $P_2$. Thus, as shown particularly in FIGS. 6 and 7, pivot $P_4$ is fixed to the outer gimbal assembly 6, and merely permits the two links 21, 24 at that corner of mechanism 20 to pivot angularly but not to be displaced linearly, the two links being retained on pivot pin $P_4$ by retainer clips 42.

The pivot pins $P_1$ and $P_3$ at the other two corners of the parallelogram mechanism 20, (i.e., the corners which carry the above-described gears 30 and 32) are not coupled to the outer gimbal assembly 6, but rather are free to move inwardly or outwardly, with respect to its axis of rotation 7, according to the centrifugal forces acting on these gears. The outward movement of the two gears is resisted by two coil springs 44, 46, which bias mechanism 20 to the inner positions of these gears. Each spring 44, 46, is applied between the two links at each of the two corners of the parallelogram mechanism 20 not occupied by the gears. The two links at these opposite corners are formed with a plurality of openings 48 to permit presetting the bias applied by springs 44 and 46.

The fixed frame 8 includes a pair of abutment members or plates, one of which is shown at 50 in FIG. 2, contacted by the gears 30, 32 when the rotational speed of the outer gimbal assembly 6 exceeds a predetermined value. For this purpose, plates 50 are preferably curved with a radius of curvature equal to the distance from it to the center of rotation of the outer gimbal assembly 6. Plates 50 further include recesses, namely throughgoing slots 52, adapted to receive the teeth of gears 30 and 32 when the latter gears contact these plates, thereby causing the gears to rotate.

Figure 8:
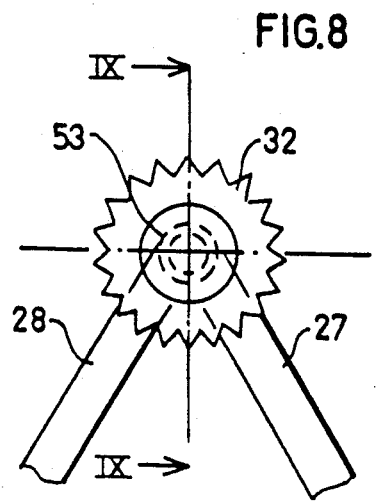
FIG. 8 is an enlarged fragmentary view illustrating the construction of one of the brake gears in the centrifugal brake assembly of FIG. 2.
Figure 9:
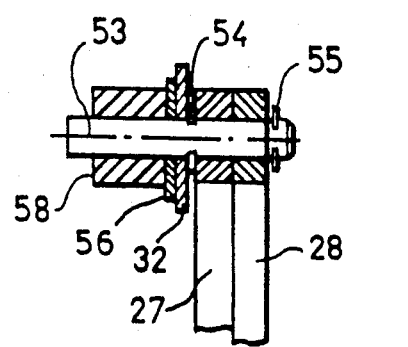
FIG. 9 is a sectional view along lines IX—IX of FIG. 8.

Each of the gears 30, 32 includes a variable loading arrangement for varying the load acting on the gear against rotation. The construction of each of the mountings for the two gears 30, 32 for this purpose is more particularly illustrated in FIGS. 8 and 9 with respect to gear 32. Thus, gear 32 is received on a shaft 53, which shaft also receives the ends of the two links 27, 28. One of the links, namely 28, is fixedly secured to shaft 53, while the other link 27 is free to pivot with respect to it. The shaft further includes retainer clips 54, 55 on the opposite sides of the two links.

Gear 32 is rotatably mounted on shaft 53. A friction disk 56 is also mounted on shaft 53 and is pressed against gear 32 by a weight 58 threaded onto the respective end of shaft 50. It will not be seen that by threading weight 58 more or less onto shaft 50, the force it applies against friction disk 56 may be varied, thereby varying the load applied to gear 32 against rotation on shaft 50.

During the normal operation of the device illustrated in the drawings, rotor 9 is driven at a high speed (e.g., 24000 RPM) along the spin axis 11. such that the gyroscopic assembly is fixed in space and the inner gimbal 4 pivots about axis 5 with changes in position of the aircraft to which frame 8 is fixed. As mentioned earlier, the inner gimbal assembly can pivot a maximum of about 82° (i.e., less than 90°) in either direction, at which time shaft extension 14 abuts one of the two stops 10, 12 on the outer gimbal assembly 6. When this occurs, the outer gimbal assembly 6 rotates or precesses around the outer gimbal shaft 7 with respect to the frame 8.

It will thus be seen that while power is on the outer gimbal assembly 6 will not pivot more than 180°, but rather will switch-over from one side to the other. However, if the power terminated, the outer gimbal assembly 6 will rotate in the same direction with accelerated speed with respect to the frame 8.

When this occurs, the gears 30, 32, carried at one pair of opposite corners of parallelogram mechanism 20, are moved outwardly by centrifugal force against the bias of the coil springs 44, 46, applied to the other pair of opposite corners. The magnitude of outward displacement of the two gears 30, 32 increases with an increase in velocity, until a point is reached when the gears 30, 32 engage the abutment plates 50 fixed to the frame. When this occurs, plates 50 not only prevent any further outward displacement of the gears 30, 32, but also cause the two gears to rotate against the force of the friction disks 56 (FIG. 9) loading the gears against rotation, as described above. This rotation of the gears 30, 32 produces a rotary torque applied to the outer gimbal assembly 6 which causes the inner gimbal assembly 4 to precess and to move away from the stops 10, 12.

It will thus be seen that the rotary gears 30, 32, not only restrict the rotational speed of the outer gimbal assembly 6 with respect to the frame 8, but also produces forces which cause the inner gimbal assembly 4 to move, by precession, away from contact with the two stops 10, 12. As described earlier, the amount of the force applied by the gears 30, 32 can be pre-set by the threaded weight 58 acting on the friction disk 56. Further, by using gears 30, 32 having teeth received within recesses 52 in the abutment plates 50, the contact time between the gears 30, 32 and the abutment plates 50 is increased, thereby enhancing these speed-limiting and precession effects.

While the invention has been described with respect to one preferred embodiment, it will be appreciated that many variations and modifications may be made. For example, instead of using friction pads 56 (FIG. 9) there may be used torsion springs for loading the gears 30, 32 against rotation. Further, instead of gears there may be used rollers, but this would decrease the contact time between the brake element and the abutment plate 50. Many other variations, modifications and applications of the invention will be apparent to those skilled in the art.

I claim:

1. A centrifugal brake for limiting the rotational speed of a rotatable body with respect to a reference body, which brake includes at least one brake element movable by centrifugal force into engagement with an abutment member fixed to the reference body when the rotational speed of the rotatable body exceeds a predetermined value with respect to the reference body; wherein each of said at least one brake elements is disposed at a corner of a parallelogram mechanism made of a plurality of pivotably-coupled links such that the brake element is displaced into contact with the abutment member of the reference body when the rotational speed of the rotatable body exceeds the predetermined value, each of said at least one brake elements comprising a rotatable gear which engages the abutment member of the reference body, which abutment member is formed with recesses receiving the teeth of the gear when the gear is brought into contact with the abutment member, whereby the rotatable gear is operative to also apply a torque to the rotatable body via said parallelogram mechanism.

2. A centrifugal brake for limiting the rotational speed of a rotatable body with respect to a reference body, which brake includes at least one brake element movable by centrifugal force into engagement with an abutment member fixed to the reference body when the rotational speed of the rotatable body exceeds a predetermined value with respect to the reference body; wherein each of said at least one brake elements is disposed at a corner of a parallelogram mechanism made of a plurality of pivotably-coupled links such that the brake element is displaced into contact with the abutment member of the reference body when the rotational speed of the rotatable body exceeds the predetermined value, wherein said parallelogram mechanism includes four linds pivotably mounted to each other and to the rotational body such that a first pair of opposite corners of the parallelogram mechanism are displaced away from the center of rotation of the rotational body by centrifugal force, while the remaining pair of opposite corners are displaced towards the center of rotation of the rotational body, each one of said at least one brake elements being mounted to one corner of said first pair of opposite corners of the parallelogram mechanism.

3. A centrifugal brake according to claim 2, wherein the parallelogram mechanism includes a spring bias tending to displace each brake element away from the abutment member.

4. A centrifugal brake according to claim 3, wherein said spring bias comprises a tension spring coupled at preselected points to the pivotable links at each of said remaining pair of opposite corners in order to vary said bias.

5. A centrifugal brake according to claim 2, wherein the two links at said first pair of opposite corners are extended past the pivot point at the respective corner, and are pivotably connected to further links forming therewith a smaller parallelogram mechanism at the outer end of the respective corner, to which is mounted a brake element.

6. A centrifugal brake according to claim 2, wherein each of said at least one brake elements is a rotatable member adapted to engage an abutment member of the reference body to also apply a torque to the rotatable body via said parallelogram mechanism.

7. A centrifugal brake according to claim 6, wherein each rotatable member is a gear, said abutment member being formed with recesses receiving the teeth of the respective gear when the gear is brought into contact therewith.

8. A centrifugal brake according to claim 2 wherein one corner of said remaining pair of opposite corners of the parallelogram mechanism is fixed to said rotatable body against inward or outward movement with respect to its center of rotation, and the other corner of said remaining pair is coupled to said rotatable body by a connection permitting inward and outward movement with respect to its center of rotation.

9. A centifugal brake for limiting the rotational speed of a rotatable body with respect to a reference body, which brake includes at least one brake element movable by centrifugal force into engagement with an abutment member fixed to the reference body when the rotational speed of the rotatable body exceeds a predetermined value with respect to the reference body; wherein each of said at least one brake elements is disposed at a corner of a parallelogram mechanism made of a plurality of pivotably-coupled links such that the brake element is displaced into contact with the abutment member of the reference body when the rotational speed of the rotatable body exceeds the predetermined value, each of said at least one brake elements comprising variable loading means for varying the load on the brake element against rotation, wherein said variable loading means comprises a friction disc disposed between said brake element and a shaft on which it rotates, and means for varying the force applied by said friction disc to said brake element.

10. A gyroscope including a frame, an outer gimbal assembly rotatably mounted about a first axis with respect to said frame, and an inner gimbal assembly rotatably mounted with respect to said outer gimbal assembly about a second axis at a right angle to the first axis, said outer gimbal assembly being equipped with a centrifugal brake for limiting the rotational speed of the outer gimbal with respect to the frame which brake includes at least one brake element movable by centrifugal force into engagement with an abutment member fixed to the frame when the rotational speed of the outer gimbal exceeds a predetermined value with respect to the frame; wherein each of said at least one brake elements is disposed at a corner of a parallelogram mechanism made of a plurality of pivotably-coupled links such that the brake element is displaced into contact with the abutment member of the frame when the rotational speed of the outer gimbal exceeds the predetermined value, said parallelogram mechanism includes four links pivotably mounted to each other and to the outer gimbal such that a first pair of opposite corners of the parallelogram mechanism are displaced away from the center of rotation of the outer gimbal by centrifugal force, while the remaining pair of opposite corners are displaced towards the center of rotation of the outer gimbal, each one of said at least one brake elements being mounted to one corner of said first pair of opposite corners of the parallelogram mechanism.

* * * * *